United States Patent
McBrearty et al.

(10) Patent No.: US 7,069,410 B2
(45) Date of Patent: Jun. 27, 2006

(54) APPARATUS AND METHOD OF CREATING A MIRRORING MAP FOR USE WITH DIFFERENT PIECES OF DATA

(75) Inventors: Gerald Francis McBrearty, Austin, TX (US); Shawn Patrick Mullen, Buda, TX (US); Johnny Meng-Han Shieh, Austin, TX (US); Thomas Van Weaver, Dripping Springs, TX (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 10/015,223

(22) Filed: Dec. 17, 2001

(65) Prior Publication Data

US 2003/0115436 A1    Jun. 19, 2003

(51) Int. Cl.
*G06F 12/00* (2006.01)
(52) U.S. Cl. ...................................................... 711/202
(58) Field of Classification Search ................ 711/112, 711/114, 153, 161, 162, 202; 707/204; 714/6; 345/544

See application file for complete search history.

(56) References Cited

U.S. PATENT DOCUMENTS

| | | | |
|---|---|---|---|
| 6,385,706 B1 * | 5/2002 | Ofek et al. | 711/162 |
| 6,499,091 B1 * | 12/2002 | Bergsten | 711/162 |
| 6,501,905 B1 * | 12/2002 | Kimura | 386/126 |
| 6,574,709 B1 * | 6/2003 | Skazinski et al. | 711/119 |
| 6,654,830 B1 * | 11/2003 | Taylor et al. | 710/74 |

FOREIGN PATENT DOCUMENTS

EP         1012721 B1 * 11/2001

* cited by examiner

*Primary Examiner*—Pierre Vital
(74) *Attorney, Agent, or Firm*—Volel Emile; Mark E. McBurney

(57) ABSTRACT

A method, system and apparatus for allowing a mirroring map to be used with more than one piece of data are provided. First, a mirroring map is created and given a name. Then, the name of the mirroring map and the mirroring map itself are stored into the computer system. When a piece of data is to be stored in accordance with the mirroring map any time thereafter, the name of the mirroring map is used to associate the mirroring map with the piece of data.

20 Claims, 11 Drawing Sheets

APPARATUS AND METHOD OF CREATING A MIRRORING MAP FOR USE WITH DIFFERENT PIECES OF DATA

CROSS-REFERENCE TO RELATED APPLICATIONS

This application is related to U.S. patent application Ser. No. 10/015,292 which has been issued as U.S. Pat. No. 6,804,747, entitled APPARATUS AND METHOD OF REDUCING PHYSICAL STORAGE SYSTEMS NEEDED FOR A VOLUME GROUP TO REMAIN ACTIVE by the inventors herein, filed on even date herewith and assigned to the common assignee of this application.

BACKGROUND OF THE INVENTION

1. Technical Field

The present invention is directed to a method and apparatus for managing data storage systems. More specifically, the present invention is directed to a method and apparatus for facilitating a volume manager to manage mirrored physical storage systems.

2. Description of Related Art

Most computer systems are made up of at least one processor and one physical storage system. The processor processes, stores and retrieves data from the physical storage system under the guidance of an application program.

Application programs generally run atop an operating system. Among the many tasks of an operating system is that of allowing an application program to have a rather simplistic view of how data (i.e., data files) are stored within a physical storage system. Typically, an application program views the physical storage system as containing a number of hierarchical partitions (i.e., directories) within which entire data files are stored. This simplistic view is often referred to as a logical view since most files are not really stored as unit bodies into directories but rather are broken up into data blocks that may be strewn across the entire physical storage system.

The operating system is able to allow an application program to have this simplistic logical view with the help of a file management system. The file management system stores directory structures, breaks up data files into their constituent data blocks, stores the data blocks throughout a physical storage system and maintains data logs of where every piece of data is stored. Thus, the file management system is consulted whenever data files are being stored or retrieved from storage.

Computer systems that have a plurality of physical storage systems (e.g., servers) use an added layer of abstraction when storing and retrieving data. The added layer of abstraction is a logical volume manager (LVM). Volume, in this case, is the storage capacity of a physical storage system. Thus, volume and physical storage system will henceforth be used interchangeably.

The LVM arranges the physical storage systems into volume groups in order to give the impression that storage systems having each a much more voluminous storage capacity are being used. Within each volume group, one or more logical volumes may be defined. Data stored in a logical volume appears to be stored contiguously. However in actuality, the data may be interspersed into many different locations across all the physical storage systems that make up the volume group.

Stated differently, each logical volume in a logical volume group is divided into logical partitions. Likewise, each physical volume in a volume group is divided into physical partitions. Each logical partition corresponds to at least one physical partition. But, although the logical partitions in a logical volume are numbered consecutively or appear to be contiguous to each other, the physical partitions to which they each correspond, need not be contiguous to each other. And indeed, most often, the physical partitions are not contiguous to each other. Thus, one of the many tasks of the LVM is to keep tab on the location of each physical partition that corresponds to a logical partition.

For fault tolerance and performance, some servers store at least one extra copy of each piece of data onto the physical storage systems they use. Storing more than one copy of a piece of data is called mirroring the data. In order to store mirrored data, each logical partition used must correspond to as many physical partitions as there are mirrors (or copies) of the data. In other words, if the data is mirrored three times, for example, each logical partition has to correspond to three physical partitions.

Presently, each time a system administrator decides that a piece of data is to be mirrored, the administrator has to set up a mirroring map (i.e., which physical storage systems and what physical partitions in the physical storage systems to use to store the copies of the data). This can be a rather tedious task, especially, if the computer system is already using a mirroring map similar to what the administrator intends to use.

What is needed, therefore, is an apparatus and method of allowing existing mirroring maps to be used whenever applicable rather than defining a new mirroring map for each piece of data being mirrored.

SUMMARY OF THE INVENTION

The present invention provides a method, system and apparatus for allowing a mirroring map to be used for more than one piece of data. In other words, the invention allows a mirroring map that describes the layout of logical storage with respect a physical storage to be used with more than one piece of data. First, a mirroring map is created and given a name. Then, the name of the mirroring map and the mirroring map itself are stored into the computer system. When a piece of data is to be stored in accordance with the mirroring map any time thereafter, the name of the mirroring map is used to associate the mirroring map with the piece of data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
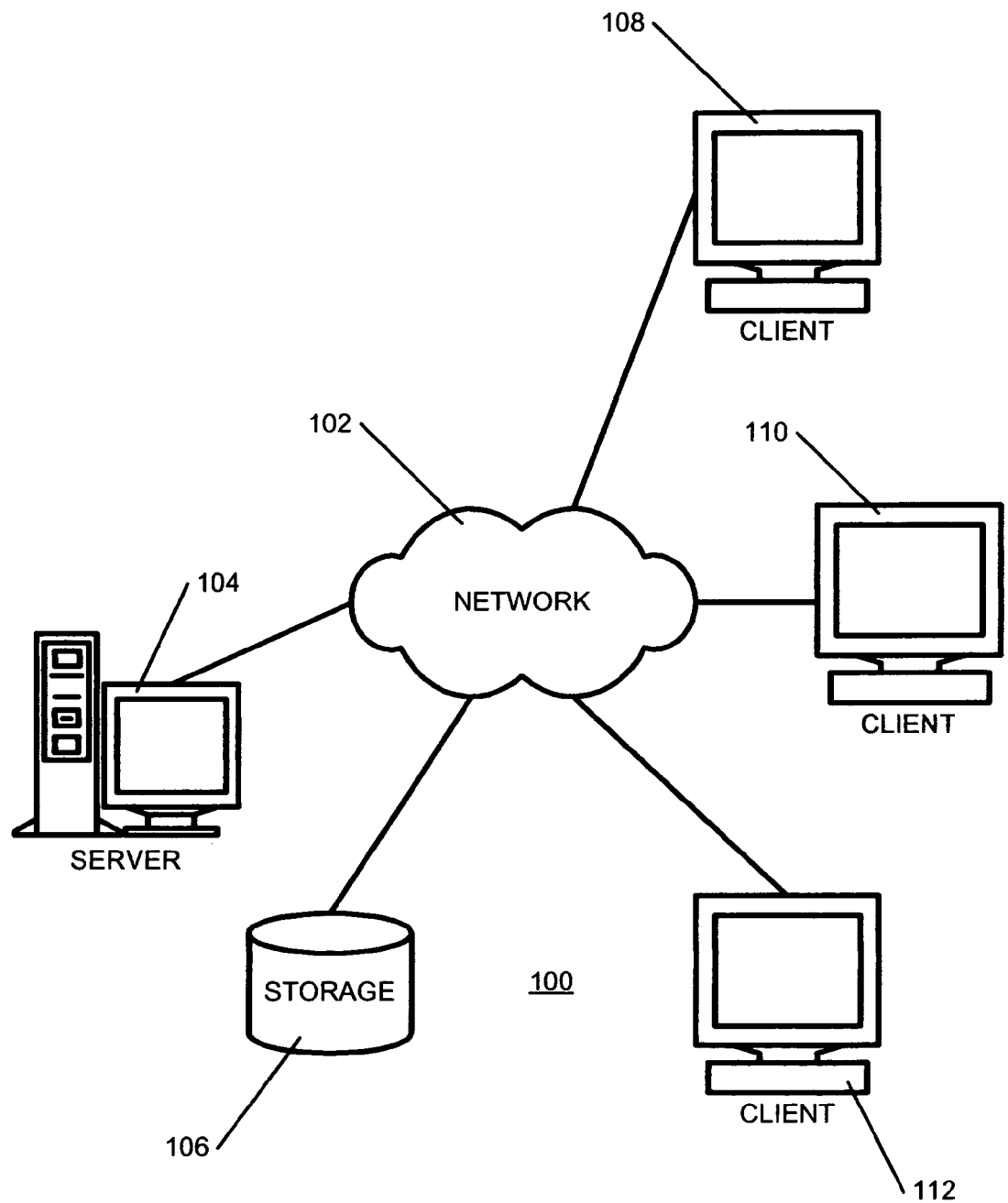
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
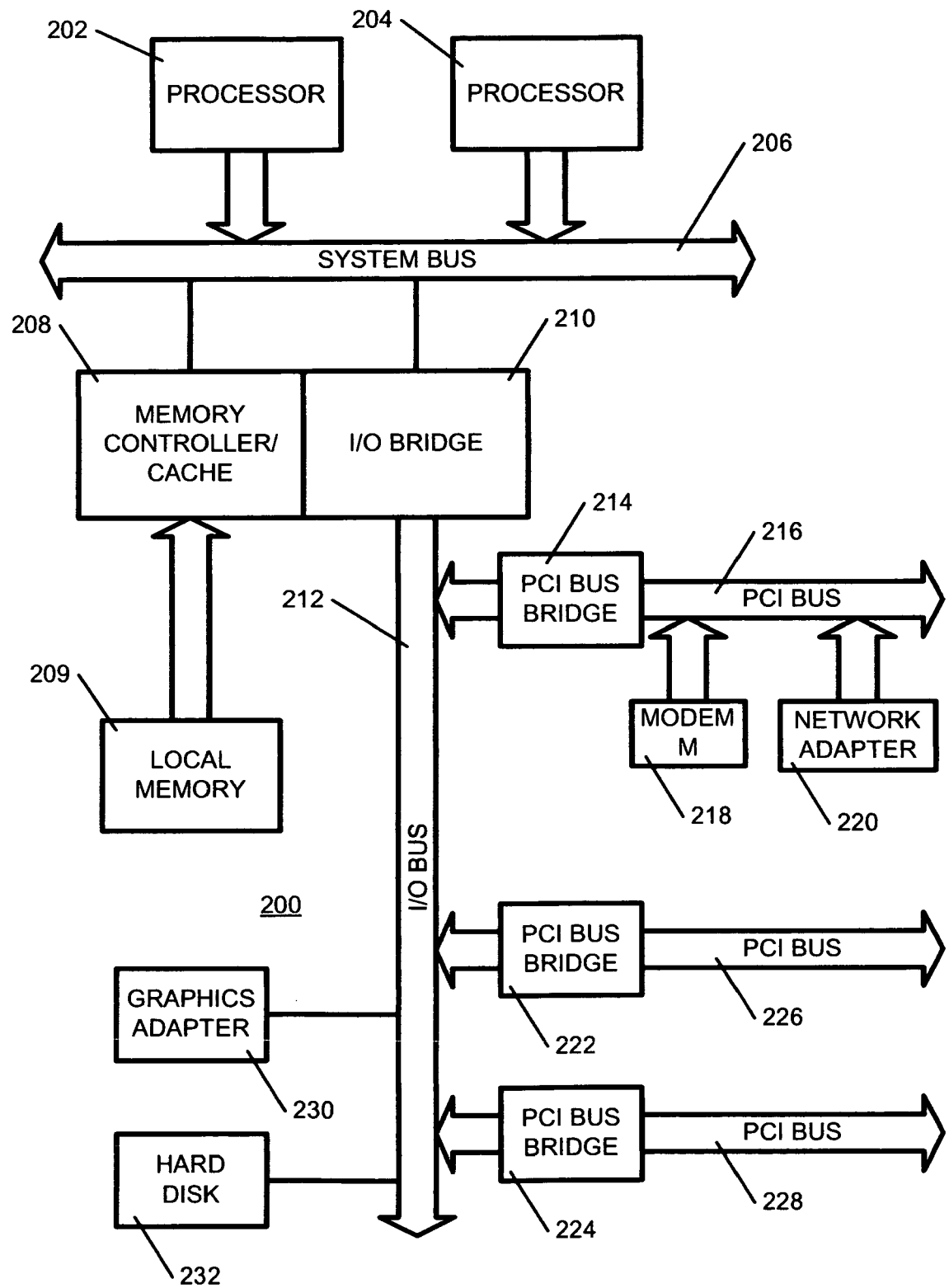
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. Input/output (I/O) bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
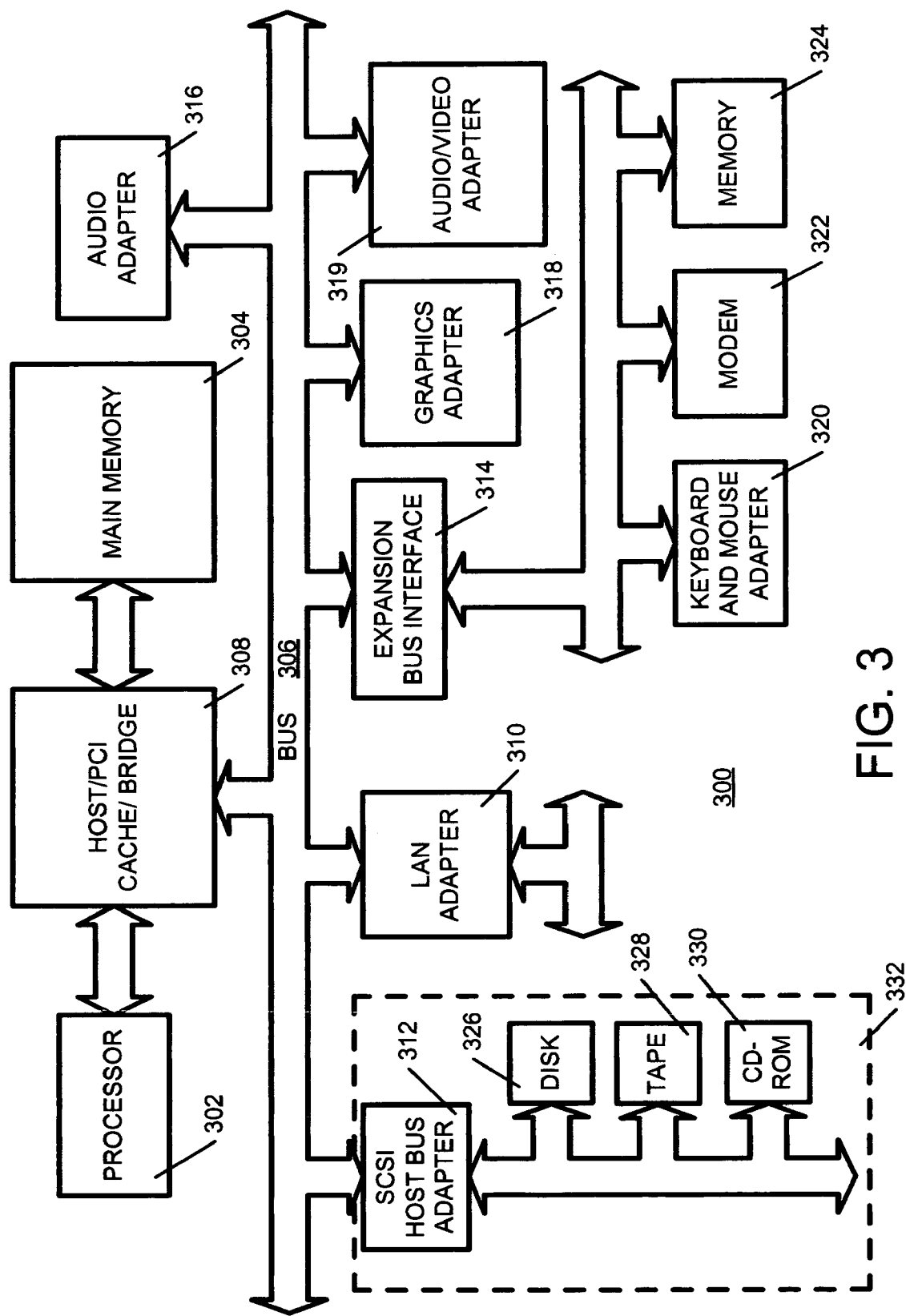
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and compact disk-read-only memory (CD-ROM) drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method that allow existing mirroring maps to be used for mirroring new pieces of data. Although the invention may preferably be local to server 104, it may nonetheless, be local to client systems 108, 110 and 112 of FIG. 1 or to both the server 104 and clients 108, 110 and 112. Consequently, the present invention may reside on any data storage medium (i.e., floppy disk, compact disk, hard disk, ROM, RAM, etc.) used by a computer system.

Figure 4:
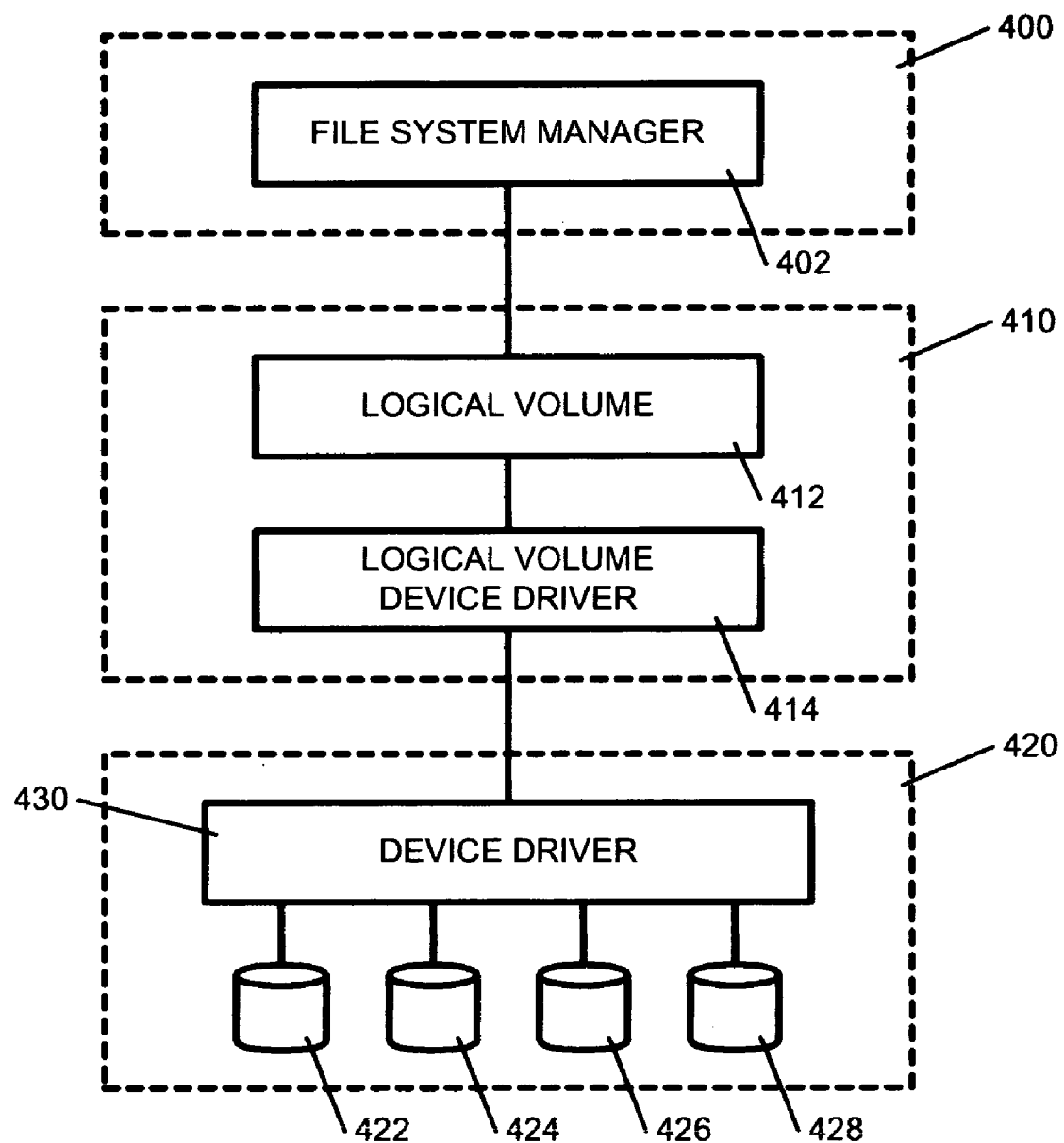
FIG. 4 is a conceptual view of a logical volume manager (LVM).

To better understand the invention, a more detailed explanation of a logical volume manager (LVM) is needed. The LVM interacts with application programs and the physical storage devices as shown in FIG. 4. In FIG. 4 three layers are depicted, an application layer 400, a logical layer 410 and a physical layer 420 each having one or more devices. It should be noted that the devices shown in the three layers are not all inclusive. There may be more devices in use in each of the application layer 400, the logical layer 410 and the physical layer 420. Thus, the devices in FIG. 4 should be taken only as an example of devices that may be used.

The logical layer 410, for all intent and purposes, is the LVM. The LVM may be regarded as being made up of a set of operating system commands, library subroutines or other tools that allow a user to establish and control logical volume storage. The LVM controls physical storage system resources by mapping data between a simple and flexible logical view of storage space and the actual physical storage system. The LVM does this by using a layer of device driver code that runs above traditional device drivers. This logical view of the disk storage is provided to application programs and is independent of the underlying physical disk structure.

The logical layer 410 contains a logical volume 412 that interacts with logical volume device driver 414. A device driver, as is well known in the art, acts as a translator between a device and programs that use the device. That is, the device driver accepts generic commands from programs and translates them into specialized commands for the device. In this case, the logical volume device driver 414 translates commands from an application program that may be executing on the computer system for device driver 430. Thus, when an application program sends commands to file system manager 402 to store or retrieve data from logical volume 412, the file system manager 402 informs the logical volume 412 of the application program's wish. The logical volume 412 then conveys the wish to the logical volume device driver 414. The logical volume device driver 414 then consults the appropriate map and instructs the device driver 430 which ones of physical storage systems 422, 424, 426 and 428 to use for the data.

As mentioned in the Background of the Invention, when a system administrator wants to mirror a piece of data, the administrator has to devise a map (or mirroring scheme) to correlate the logical volume being used to the actual physical storage systems in which the data is to be stored. Generally, this map includes the partitions of the physical storage systems that are to be used. As alluded to before, this map is stored in the LVM. However, as the LVM is not aware that the physical storage systems are being used as mirrors of each other, the administrator has to maintain the map. For example, if one of the physical storage systems were to become defective and a replacement is used, the administrator has to update the map to include the replacement. Furthermore, the administrator has to devise and maintain a map for each piece of data that is to be mirrored in the computer system whether or not there is already a map in the LVM that may be used for the new pieces of data. Depending on the number of pieces of mirrored data in the computer system, this can be a rather tedious endeavor.

The invention uses an additional abstracted layer within a volume group in which physical storage systems may be defined as being mirrors of each other. Each mirrored set is given a name. Thus, when a piece of data is to be mirrored in accordance with an existing map or mirroring scheme, the name of the set is associated with the logical volume in which the data is to be written. If a replacement physical storage system is ever used, the LVM will automatically update the map.

Figure 5:
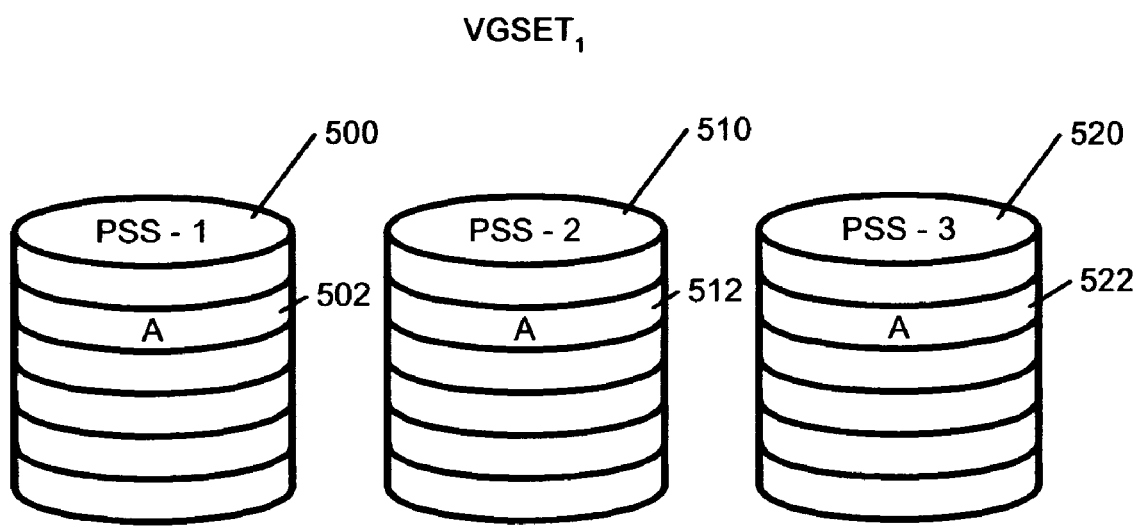
FIG. 5 illustrates a first example of a mirroring map that may be used with the present invention.

FIG. 5 illustrates a first example of a mirroring map that may be used with the present invention. In this example, three physical storage systems (PSS) are used. The physical storage systems are PSS-1 500, PSS-2 510 and PSS-3 520. The mirroring map of FIG. 5 may be named, for example, $vgset_1$. The three physical storage systems are divided into partitions. Mirrored data is stored in the three physical storage systems as illustrated by data A in partitions 502, 512 and 522 of PSS-1 500, PSS-2 510 and PSS-3 520.

Figure 6:
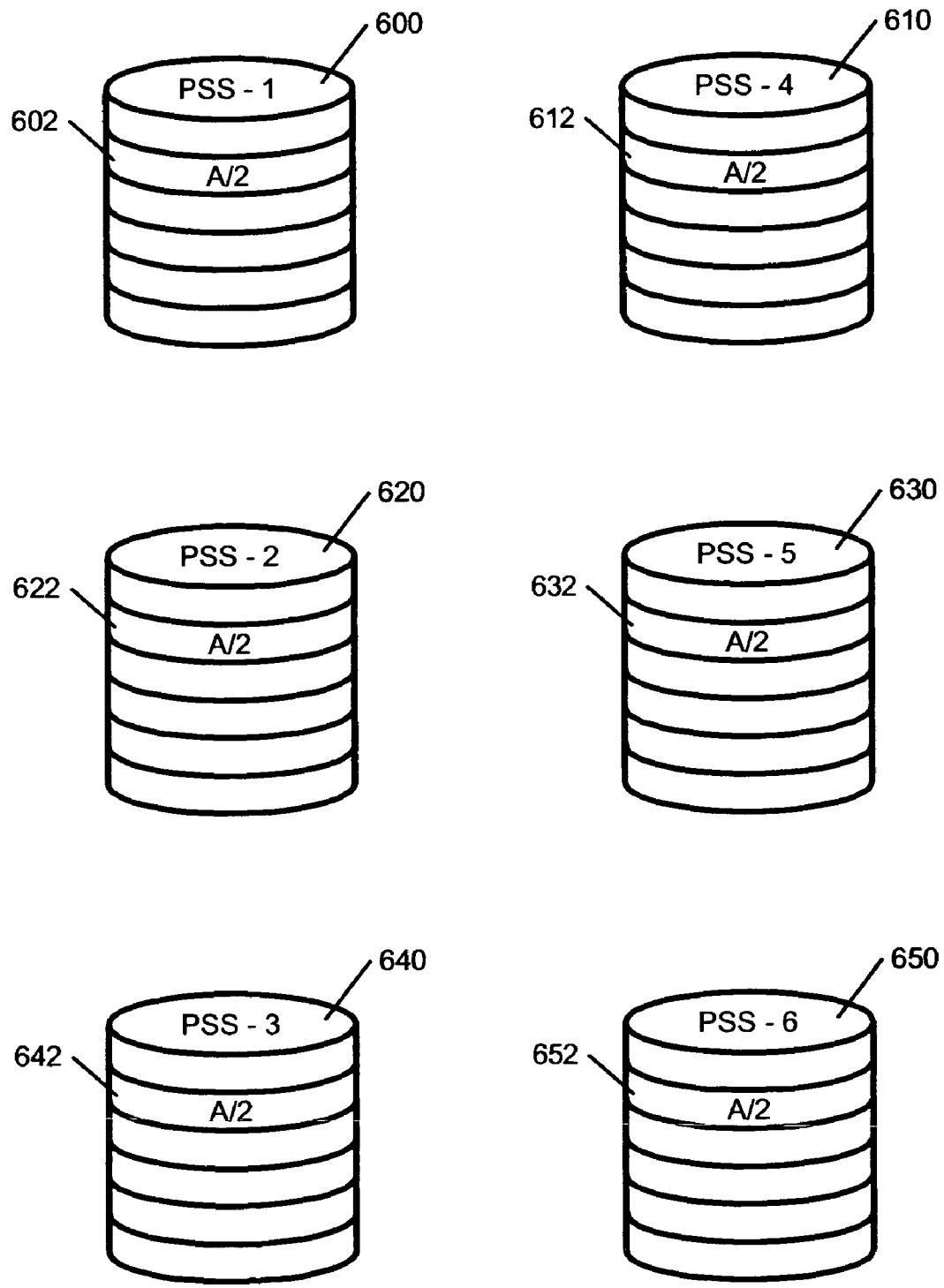
FIG. 6 illustrates a second example of a mirroring map that may be used with the present invention.

FIG. 6 illustrates another mirroring map that may be used with the present invention. The mirroring map, as shown in FIG. 6 may be named, for example, $vgset_2$. In FIG. 6, the physical storage systems are arranged in pairs. Each physical storage system of a pair contains a part of data A. For example, PSS-1 600 is paired off with PSS-4 610. Likewise, PSS-2 620 is paired off with PSS-5 630 and PSS-3 640 is paired off with PSS-6 650. PSS-1 600 contains the first half of data A and PSS-4 610 contains the second half of data A. The data in pairs PSS-2/PSS-5 and PSS-3/PSS-6 mirrors the data in pair PSS-1/PSS-4. This manner of storing data is called striping as a stripe of the data is stored in each physical storage system of a pair.

Obviously, both FIG. 5 and FIG. 6 illustrate examples of mirroring maps that may be used with the present invention. They, by no means, are all inclusive.

Three new commands are used with the invention. The commands are: "create mirroring map", "display mirroring map" and "associate logical volume with mirroring map". In the commands, "mirroring map" and "logical volume" are variables. For example, "mirroring map" may be the name of a particular map such as $vset_1$. Logical volume is the name of a logical volume that an application program may use when storing or retrieving a data.

When the "create" command is used, it is mandatory that the name of the mirroring map being created be provided. Likewise, when the "associate" command is used, both the name of the logical volume and the name of the mirroring map have to be provided. However, when the "display" command is used, it is not necessary that a name be provided. If a name is not provided, all the mirroring maps that have thus far been defined and stored in the LVM will be displayed. This allows the administrator to choose which existing mirroring map to associate with a logical volume. If a name is provided with the associate command, only the mirroring map identified by the name will be displayed. Display of the mirroring maps is as shown in FIGS. 5 and 6.

Figure 7:
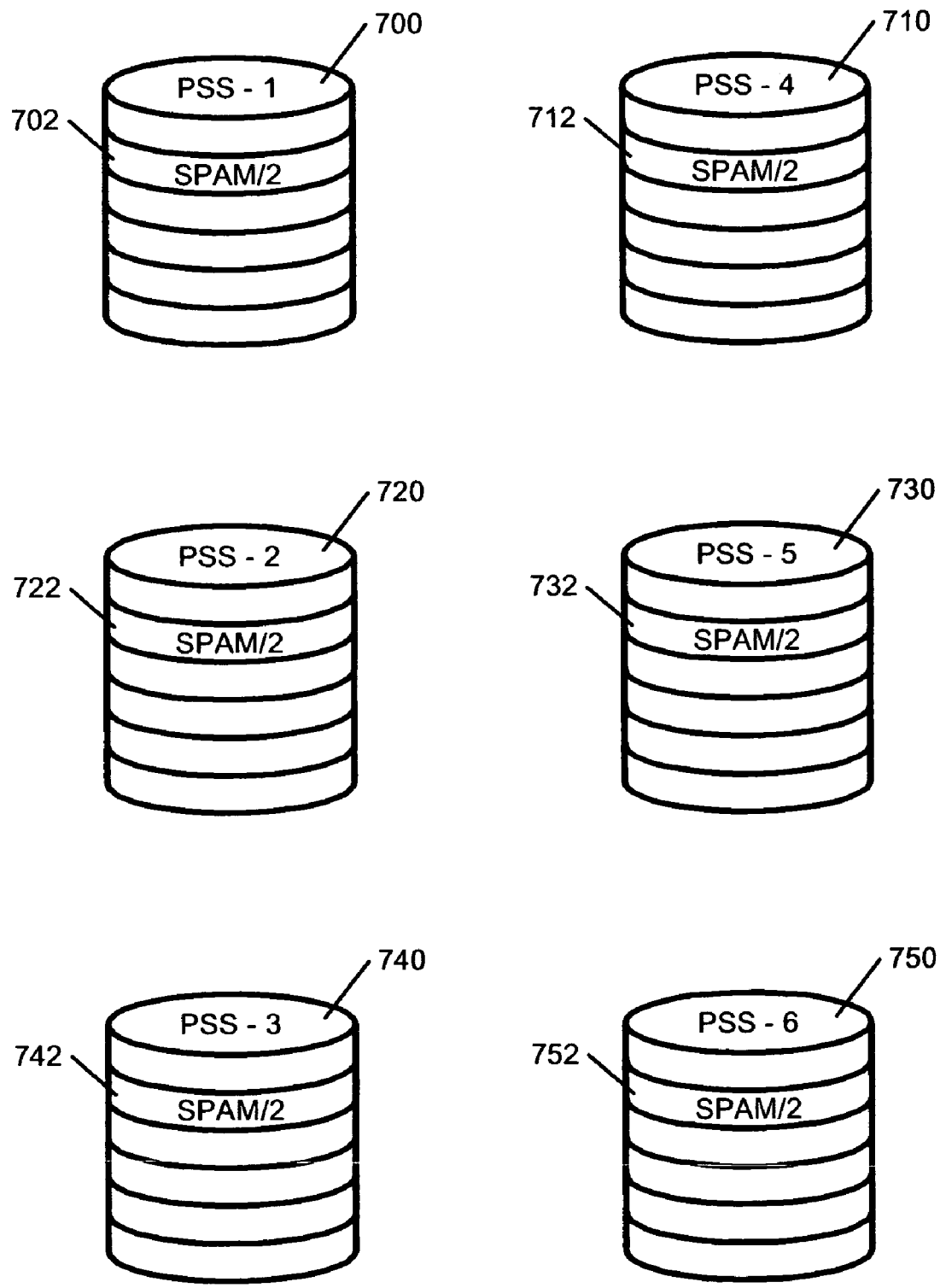
FIG. 7 illustrates an example of a piece of data mirrored in accordance with the mirroring map in FIG. 6.

As an example, suppose an application program is to store data "spam" into a logical volume called "logical volume$_1$" and suppose further that logical volume$_1$ is associated with vgset$_2$ (see FIG. 6), spam will be stored in the physical volume set as shown in FIG. 7. That is, the first half of spam will be stored in partition 702 of PSS-1 700 and the second half of spam will be stored in partition 712 of PSS-4 710. Pair PSS-2 720 and PSS-5 730 and pair PSS-3 740 and PSS-6 750 will contain a mirror image of pair PSS-1 700 and PSS-4 710.

In the example above, the format for the associate command may be: "associate logical volume$_1$ vgset$_2$ 1". This command, in essence, instructs the LVM to use mirroring map vgset$_2$ to store the data of logical volume$_1$. Consequently, the data will be stored in physical storage systems PSS-1, PSS-2, PSS-3, PSS-4, PSS-5 and PSS-6 as shown in FIG. 7. The number "1" after vgset$_2$ means that the first partition of the storage systems should be used. Specifying which partition to use is not necessary since without this specification the LVM will use the next available partitions in the physical storage systems. Indeed, because of the high likelihood for errors associated with this option (i.e., forcing the LVM to use a partition that may already be used for another piece of data) only very sophisticated administrators should ever use this option.

Figure 8:
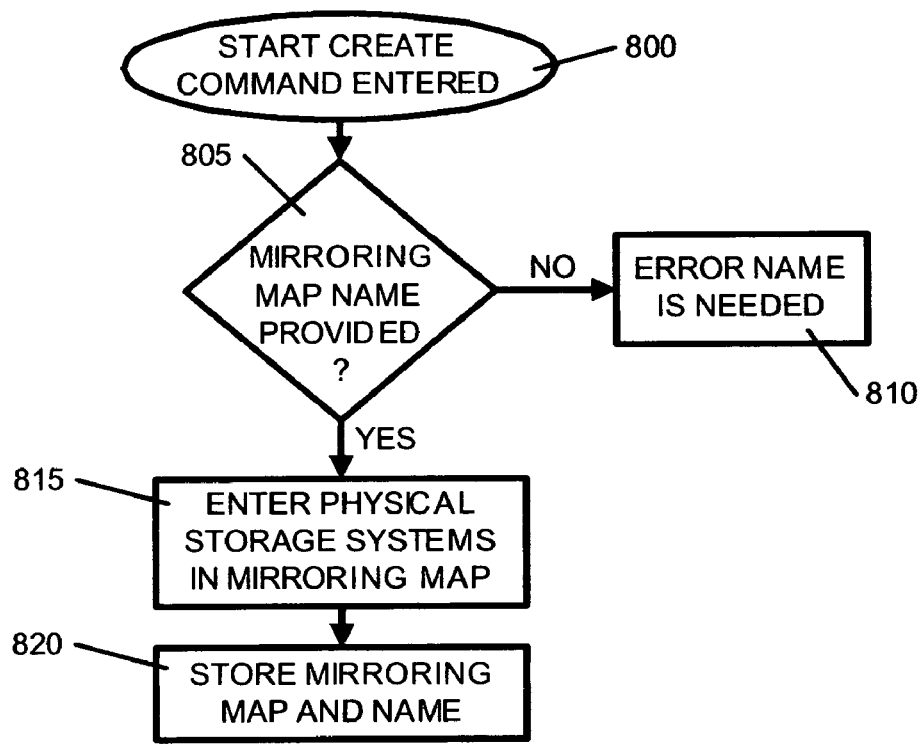
FIG. 8 illustrates a flow diagram of a process used to create a mirroring map.

FIG. 8 is a flow chart of a process that may be used to create a mirroring map. The process starts when the create command is entered into the computer system (step 800). A check is made to determine whether a name is provided for the mirroring map being created (step 805). If not, an error such as "name is needed" may be generated (step 810). If a name is provided, then the user or administrator will be allowed to define the map. To do so, a display of a physical storage system may be provided.

Using copies (by cutting and pasting, for example) of the provided physical storage system, the administrator may make any mirroring map desired. After defining a map, the administrator has to specify which physical storage systems to be used by providing the names (each physical storage system has a name) of the physical storage systems (e.g., PSS-1, PSS-2 etc.). Thus, the administrator may use two or more physical storage systems for one or more mirrored copies of the data, and only one physical storage system for the other mirror or mirrors of the data or any combination thereof.

The administrator has to also specify how the data is to be stored in the storage systems (whether the data should be striped or not and what fraction of the data is to be stored where, for example) by inserting the variable "A" or "A/2" or "A/3" or "A/4" etc. into a partition of each physical storage system. For example, suppose one copy of the data is being stored across three storage systems and A/2 is entered into one partition of a first storage system and A/4 is entered into a partition of each of the other two storage systems. Then, one half of the data will be stored in the first storage system and one quarter of the data will be stored in each of the other two storage systems. Note that if "A" is entered, the data will not be striped or rather the entire data will be stored into that storage system.

If the administrator wants to stripe the data in three stripes within only one physical storage system, the administrator may enter "A/3" into three different partitions of that storage system. Thus, the administrator may instruct the LVM to mirror the data into the physical storage systems in any combination the Administrator may choose (step 815). When done, the name of the mirroring map and the mirroring map itself are stored in the LVM for future use (step 820).

Figure 9:
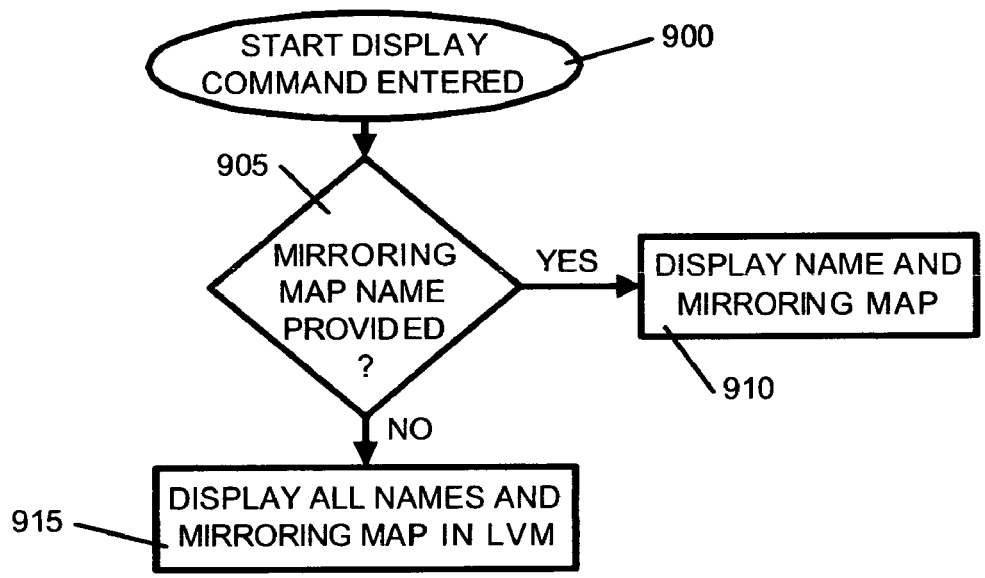
FIG. 9 illustrates a flow diagram of a process used to display mirroring maps.

FIG. 9 is a flow diagram of a process that may be used to display the mirroring maps. The process starts as soon as the display command is entered into the computer system (step 900). A check is then made to determine whether a mirroring map name is provided (step 905). If so the mirroring map associated with the name entered and the name of the mirroring map will all be displayed (step 910). If not, all the mirroring maps stored in the LVM and their names will be displayed (step 915).

Figure 10:
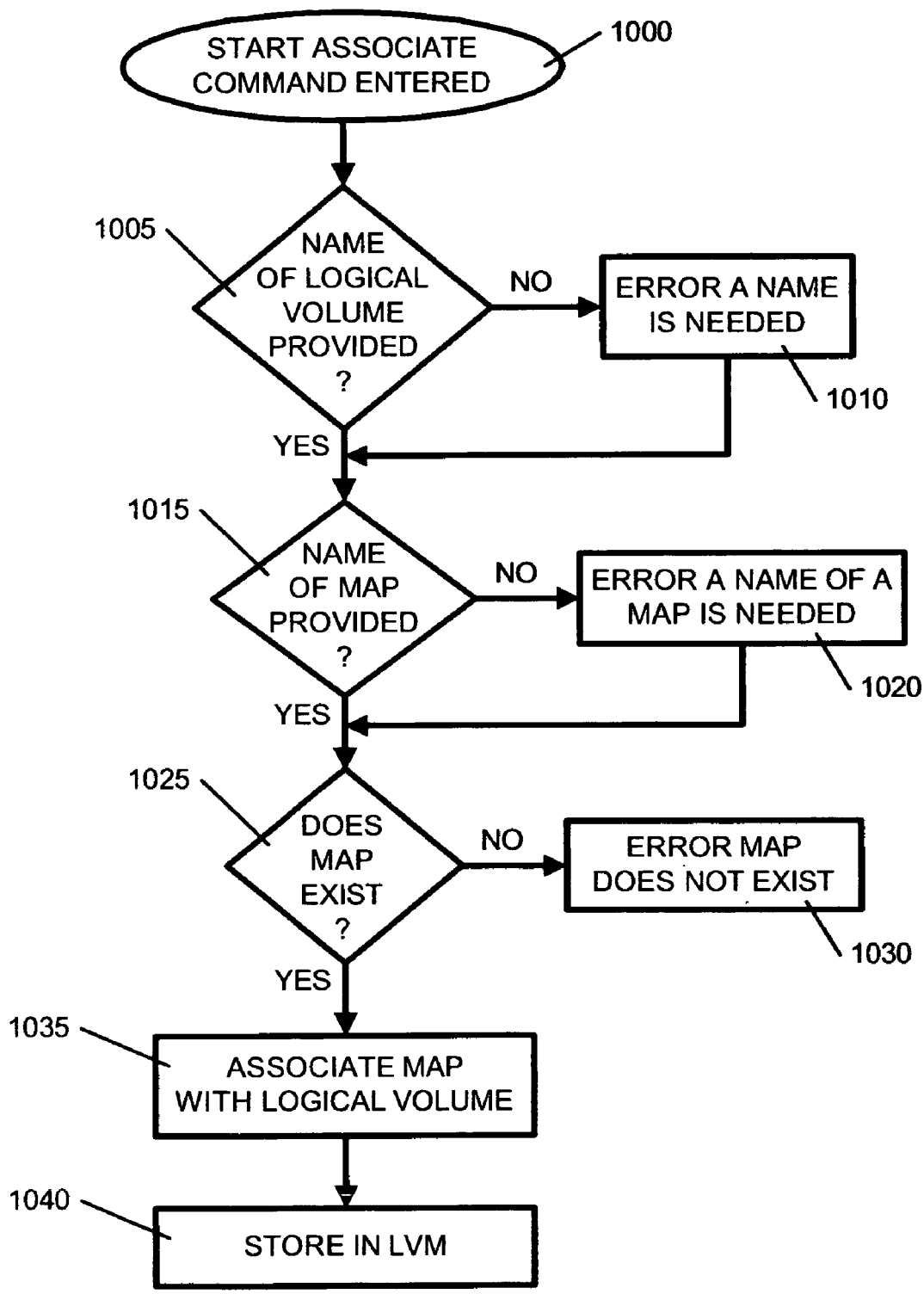
FIG. 10 illustrates a flow diagram of a process used to associate a logical volume with a mirroring map.

FIG. 10 is a flow diagram of a process that may be used to associate a logical volume with a mirroring map. The process starts when the associate command is entered into the computer system (step 1000). A first check is then made to determine whether a name of a logical volume is provided with the command (step 1005). If not, an error such as "a name of a logical volume is needed" may be generated (step 1010). If a name of a logical volume is provided with the command or after the name is entered, a second check is made to determine whether the name of the mirroring map is provided with the command (step 1015). If not, then an error such as "please enter a name of a mirroring map" may be generated (step 1020). If the name of a mirroring map is provided with the command or after entering the name of the mirroring map, a third check is made to determine whether the mirroring map exists (step 1025). If not, an error such as "mirroring map does not exist" may be generated (step 1030). If the mirroring map does exist, then the name of the logical volume provided is associated with the mirroring map and stored in the LVM for future reference (step 1035). That is, each time a piece of data is stored in the logical volume, the physical storage systems in the mirroring map will be used to store the data (step 1040).

One aspect of the invention allows a different quorum to be used to ascertain whether or not metadata in the physical storage systems of a volume group is valid. As mentioned above, metadata is data about data. Metadata describes how and when and by whom a particular set of data was collected, and how the data is formatted etc. Thus, with the use of metadata it can be determined whether or not a piece of data stored in a physical storage system is stale. A piece of data is said to be stale if it has been updated and for some reason the update has not been stored in the physical storage system.

When an attempt to write metadata into a physical storage system is not successful, the physical storage system is marked as unavailable. The present policy is that when half or more of the physical storage systems present that make up a volume group is marked unavailable, the volume group should not be used or remain active. This policy is used to ensure that when the computer system is turned on or is reset, if the majority of the physical storage systems in a volume group is available, the volume group may be used as metadata in at least one of the physical storage systems will be valid. The valid metadata may be copied into the other physical storage systems.

Using the present invention, if one of the physical storage systems out of each mirror set is available, then it can always be determined whether there is valid metadata. This reduces the number of physical storage systems for a volume group to remain active quite substantially.

As an example, suppose there are three (3) mirrors in each mirror set and a physical storage system is used for each mirror. Suppose further that there are thirty (30) mirror sets in a volume group. Then the number of physical storage systems in the volume group is ninety (90). Presently, the number of physical storage systems needed for the volume group to remain active is 46 (i.e., a quorum consisting of the majority of the physical storage systems). Using the present invention, however, only a quorum of thirty (30) physical storage systems is needed (one mirror out of each of the thirty (30) mirror sets).

Note that when the computer system is turned on or is reset, a full mirror set and one mirror out of each of the remaining sets are needed to determine whether there is valid metadata. Using the example above, thirty-two (32) physical storage systems have to be available to determine whether there is valid metadata. This is so because of the policy outlined above. That is, the minute that one of the mirrors that make up the thirty (30) mirrors becomes unavailable, the volume group should not remain active. This guarantees then that when the computer system is turned on or is reset if there are at least a full mirror set and at least one mirror out of each of the remaining sets available it can always be determined whether there exists valid metadata in the volume group.

Figure 11:
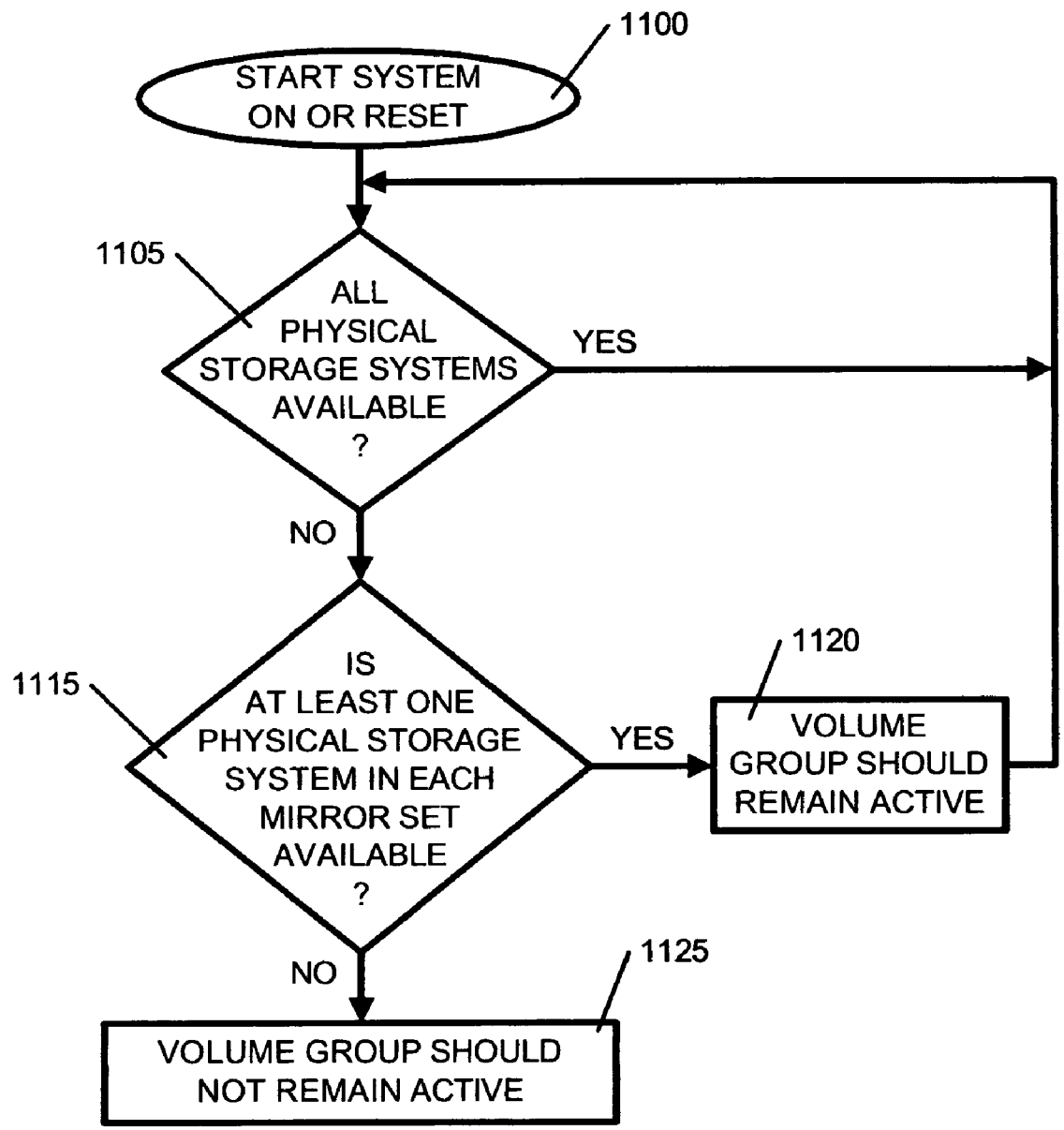
FIG. 11 is a flow diagram of a process that may be used to ascertain that there is a requisite number of physical storage systems available for a volume group to remain active.

FIG. 11 is a flow diagram of a process that may be used to ascertain whether there is a requisite number of physical storage systems available for a volume group to remain active. The process starts when a computer system is turned on or reset (step 1100). A check is continuously being made to determine whether all the physical storage systems in use are available (step 1105). If not, a check will be made to determine whether at least one physical storage system from each mirroring set is available (step 1115). If so, the volume group will remain active (step 1120). If not, the volume group should not be used or remain active anymore (step 1125).

Figure 12:
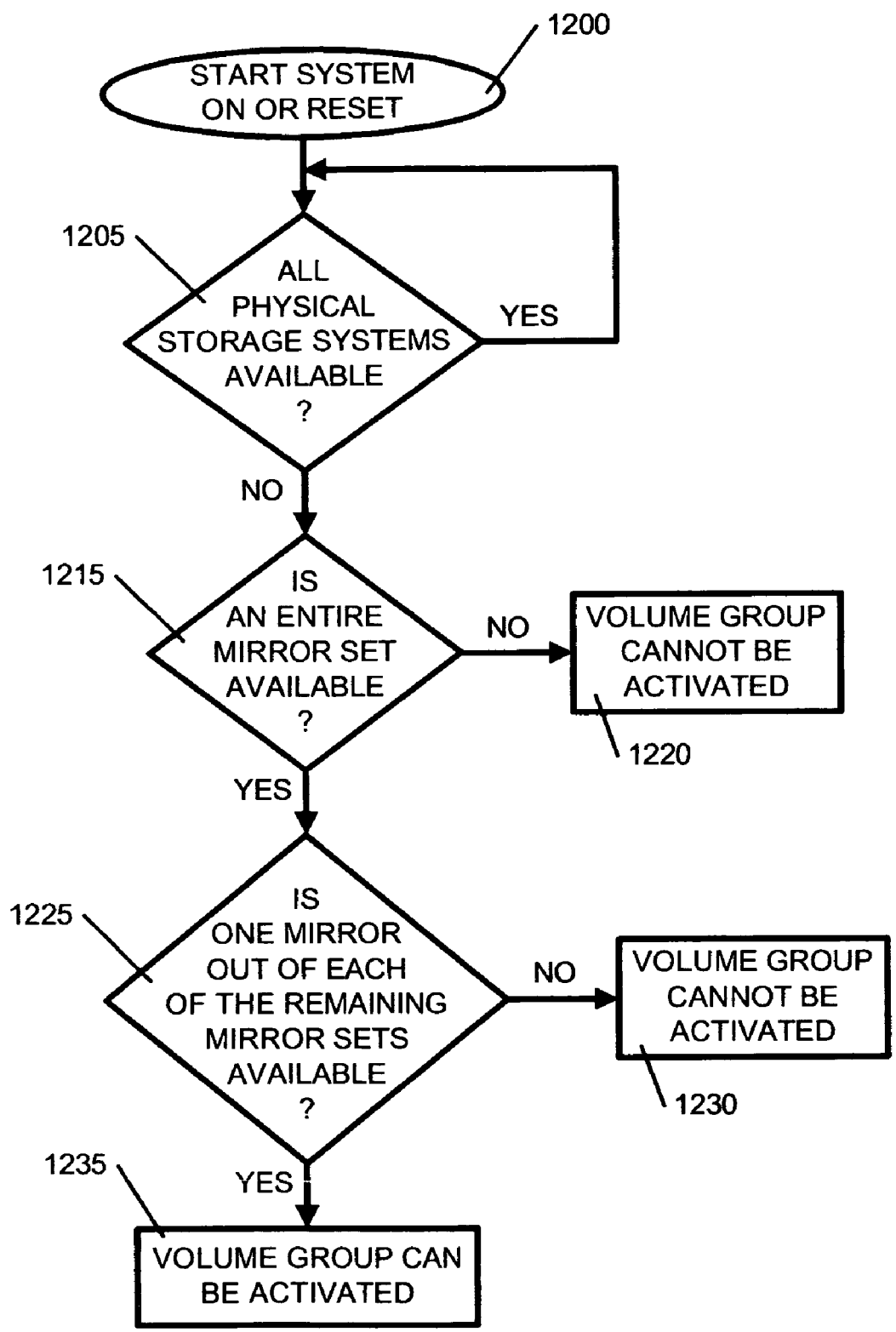
FIG. 12 is a flow diagram of a process that may be used to determine whether a volume group has a requisite number of physical storage systems available when a computer system is turned on or reset.

FIG. 12 is a flow diagram of a process that may be used to determine whether a volume group has a requisite number of physical storage systems available when a computer system is turned on or reset. Again the process starts when the computer system is turned on or reset (step 1200). A check is made to determine whether all the physical storage systems in the volume group are available (step 1205). If not, it is then determined whether an entire mirror set is available (step 1215). If not, the volume group may not activate (step 1220). If there is an entire mirror set available, it will then be determined whether at least one physical storage system out of each of the remaining mirroring sets is available (step 1225). If not, the volume group may not activate (step 1230). If so, the volume group may activate (step 1235).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of defining a mirroring map for use with different pieces of data, the mirroring map being an identification of one or more physical storage systems and one or more physical partitions in the one or more physical storage systems to use to store one or more copies of a piece of data, the method comprising the steps of:
   creating the mirroring map;
   naming the mirroring map; and
   allowing different pieces of data to be used with the mirroring map when the name of the mirroring map is associated with the different pieces of data.

2. The method of claim 1 wherein the step of allowing different pieces of data to be used with the mirroring map when the name of the mirroring map is associated with the different pieces of data includes the step of associating a volume group in which the different pieces of data are to be stored with the mirroring map.

3. The method of claim 2 wherein existing mirroring maps may be displayed when selecting a mirroring map to associate with a piece of data.

4. The method of claim 3 wherein a mirroring map may be created for facilitating striping a piece of data.

5. The method of claim 4 wherein a partition may be specified when storing data in a mirroring map.

6. A computer program product on a computer readable medium for defining a mirroring map for use with different pieces of data, the mirroring map being an identification of one or more physical storage systems and one or more physical partitions in the one or more physical storage systems to use to store one or more copies of a piece of data, the computer program product comprising:
   code means for creating the mirroring map;
   code means for naming the mirroring map; and
   code means for allowing different pieces of data to be used with the mirroring map when the name of the mirroring map is associated with the different pieces of data.

7. The computer program product of claim 6 wherein the code means for allowing different pieces of data to be used with the mirroring map when the name of the mirroring map is associated with the different pieces of data includes code means for associating a volume group in which the different pieces of data are to be stored with the mirroring map.

8. The computer program product of claim 7 wherein existing mirroring maps may be displayed when selecting a mirroring map to associate with a piece of data.

9. The computer program product of claim 8 wherein a mirroring map may be created for facilitating striping a piece of data.

10. The computer program product of claim 9 wherein a partition may be specified when storing data in a mirroring map.

11. An apparatus for defining a mirroring map for use with different pieces of data, the mirroring map being an identification of one or more physical storage systems and one or more physical partitions in the one or more physical storage systems to use to store one or more copies of a piece of data, the apparatus comprising:
   means for creating the mirroring map;
   means for naming the mirroring map; and
   means for allowing different pieces of data to be used with the mirroring map when the name of the mirroring map is associated with the different pieces of data.

12. The apparatus of claim 11 wherein the means for allowing different pieces of data to be used with the mirroring map when the name of the mirroring map is associated with the different pieces of data includes means for associating a volume group in which the different pieces of data are to be stored with the mirroring map.

13. The apparatus of claim 12 wherein existing mirroring maps may be displayed when selecting a mirroring map to associate with a piece of data.

14. The apparatus of claim 13 wherein a mirroring map may be created for facilitating striping a piece of data.

15. The apparatus of claim 14 wherein a partition may be specified when storing data in a mirroring map.

16. A computer system for defining a mirroring map for use with different pieces of data, the mirroring map being an identification of one or more physical storage systems and one or more physical partitions in the one or more physical storage systems to use to store one or more copies of a piece of data, the computer system comprising:
   at least a memory device for storing code data; and
   at least a processor for processing said code data for creating the mirroring map, naming the mirroring map, and allowing different pieces of data to be used with the mirroring map when the name of the mirroring map is associated with the different pieces of data.

17. The computer system of claim 16 wherein processing the code data to allow different pieces of data to be used with the mirroring map when the name of the mirroring map is associated with the different pieces of data includes processing the code data to associate a volume group in which the different pieces of data are to be stored with the mirroring map.

18. The computer system of claim 17 wherein existing mirroring maps may be displayed when selecting a mirroring map to associate with a piece of data.

19. The computer system of claim 18 wherein a mirroring map may be created for facilitating striping a piece of data.

20. The computer system of claim 19 wherein a partition may be specified when storing data in a mirroring map.

* * * * *